United States Patent
Usui et al.

(10) Patent No.: US 11,985,285 B2
(45) Date of Patent: May 14, 2024

(54) DISPLAY APPARATUS FOR DISPLAYING IDENTIFICATION LABEL FOR IDENTIFYING GROUP OF DESTINATION CANDIDATES

(71) Applicant: SEIKO EPSON CORPORATION, Tokyo (JP)

(72) Inventors: Daigo Usui, Shiojiri (JP); Masato Tsukioka, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/159,689

(22) Filed: Jan. 26, 2023

(65) Prior Publication Data

US 2023/0247162 A1    Aug. 3, 2023

(30) Foreign Application Priority Data

Jan. 28, 2022  (JP) .................................. 2022-011718

(51) Int. Cl.
*H04N 1/32* (2006.01)
*G06F 3/04855* (2022.01)
*H04N 1/00* (2006.01)

(52) U.S. Cl.
CPC ..... *H04N 1/32101* (2013.01); *G06F 3/04855* (2013.01); *H04N 1/00427* (2013.01); *H04N 2201/3208* (2013.01)

(58) Field of Classification Search
None
See application file for complete search history.

(56) References Cited

U.S. PATENT DOCUMENTS

2011/0188076 A1    8/2011   Maeda

FOREIGN PATENT DOCUMENTS

JP        2011160027 A       8/2011

*Primary Examiner* — Lennin R Rodriguezgonzalez
(74) *Attorney, Agent, or Firm* — CHIP LAW GROUP

(57) ABSTRACT

A multifunction peripheral includes a storage unit configured to store destination book data including a plurality of destination candidates, a display unit configured to display a destination designation screen including a destination candidate display section for displaying a predetermined number of destination candidates among the plurality of destination candidates and a scroll bar corresponding to the destination candidate display section, an operation unit configured to receive operation for pointing a position in the destination designation screen, and a control unit configured to specify, based on the operation on the operation unit, a destination out of the plurality of destination candidates. The plurality of destination candidates can be classified into a plurality of groups. The display unit adds, to the scroll bar, an identification label for identifying a group of the destination candidates and displays the identification label.

13 Claims, 7 Drawing Sheets

DISPLAY APPARATUS FOR DISPLAYING IDENTIFICATION LABEL FOR IDENTIFYING GROUP OF DESTINATION CANDIDATES

The present application is based on, and claims priority from JP Application Serial Number 2022-011718, filed Jan. 28, 2022, the disclosure of which is hereby incorporated by reference herein in its entirety.

BACKGROUND

1. Technical Field

The present disclosure relates to a display apparatus.

2. Related Art

There has been known a communication apparatus capable of transmitting and receiving data of an electronic mail, a facsimile, and the like, when transmitting the data, the communication apparatus displaying, on a display unit, a registered plurality of destinations and causing a user to select a desired destination out of the plurality of destinations.

In a communication apparatus described in JP-A-2011-160027 (Patent Literature 1), a button for scrolling destination candidates is displayed on a screen of a display unit together with a predetermined number of destination candidates. By operating the button, a user can cause the display unit to display, in the screen, a desired destination candidate out of a plurality of destination candidates and can select the desired destination candidate as a destination.

However, in the communication apparatus described in Patent Literature 1, the user needs to find out a desired destination while scrolling the destination candidates by operating the button. Therefore, when a large number of destination candidates are registered, the operation is complicated and, moreover, it takes time to find out a desired destination candidate.

SUMMARY

A display apparatus includes: a storage unit configured to store destination book data including a plurality of destination candidates; a display unit configured to display a display image including a destination candidate display section for displaying a predetermined number of destination candidates among the plurality of destination candidates and a scroll bar corresponding to the destination candidate display section; an operation unit configured to receive operation for pointing a position in the display image; and a control unit configured to specify, based on the operation, a destination out of the plurality of destination candidates. The plurality of destination candidates can be classified into a plurality of groups. The display unit adds, to the scroll bar, a first identification label for identifying a group of the destination candidates and displays the first identification label.

DESCRIPTION OF EXEMPLARY EMBODIMENTS

1. First Embodiment

A first embodiment is explained with reference to the drawings.

Figure 1:
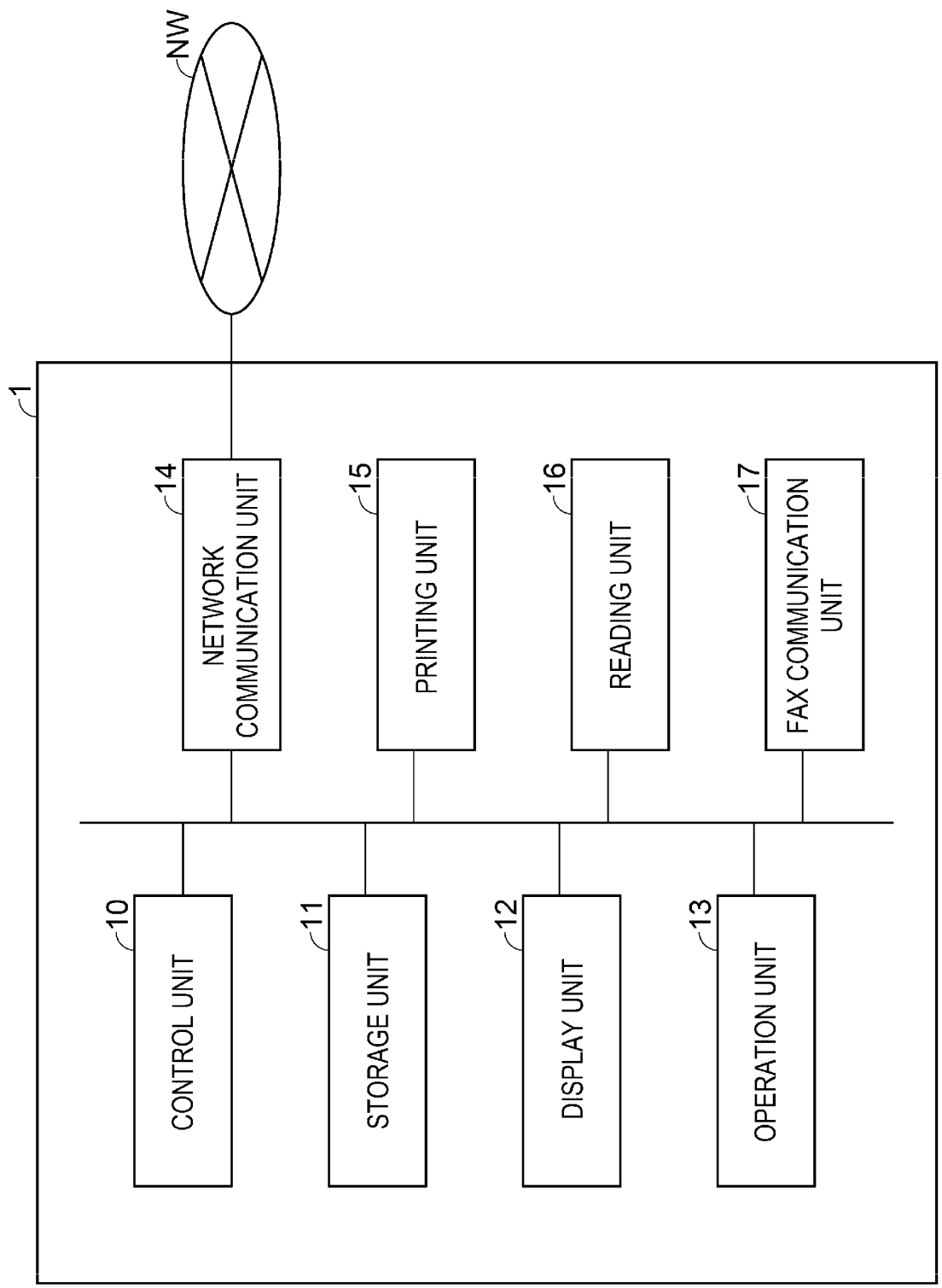
FIG. 1 is a block diagram showing a configuration of a multifunction peripheral.

FIG. 1 is a block diagram showing a configuration of a multifunction peripheral 1 functioning as a display apparatus in this embodiment.

As shown in FIG. 1, the multifunction peripheral 1 includes a control unit 10, a storage unit 11, a display unit 12, an operation unit 13, a network communication unit 14, a printing unit 15, a reading unit 16, and a facsimile communication unit 17.

The control unit 10 is a processor including a CPU (Central Processing Unit), a ROM (Read Only Memory), and a RAM (Random Access Memory) not shown in FIG. 1. The control unit 10 executes various programs recorded in the storage unit 11 to thereby control the units of the multifunction peripheral 1. The control unit 10 may be configured by a single chip or may be configured by a plurality of chips. For example, an ASIC (Application Specific IC) may be adopted instead of the CPU. The CPU and the ASIC may be configured to cooperate.

The storage unit 11 is configured by a nonvolatile memory or the like and stores the programs explained above, various data, and the like. Not-shown destination book data in which a plurality of mail addresses and the like are registered is stored in the storage unit 11 in this embodiment.

The display unit 12 is configured by a display apparatus such as a liquid crystal display or an organic EL (Electro-Luminescence) display and displays various display images based on the control of the control unit 10.

The operation unit 13 is a device capable of detecting operation performed by a finger or the like of a user. In this embodiment, the operation unit 13 is configured by a touch sensor disposed over the display unit 12. That is, the display unit 12 and the operation unit 13 function as a touch panel display. The operation unit 13 receives operation of the user for pointing a position in a display image displayed by the display unit 12. The control unit 10 executes various kinds of processing according to, for example, positions pointed by the operation. The operation unit 13 is capable of detecting, as the operation for pointing a position in the display image, for example, "tap" for touching the display image with a finger and, thereafter, releasing the finger and "drag" for moving the finger in a predetermined direction in a state in which the finger is touching the display image. The operation unit 13 is not limited to the touch sensor disposed over the display unit 12 and may be, for example, an operation button disposed around the display unit 12. In this case, the user operates the operation button to thereby move a pointer displayed on the display unit 12.

The network communication unit 14 includes various circuits for performing communication with an external apparatus via a network NW such as a LAN (Local Area Network). A form of the communication may be wired communication or may be wireless communication.

The printing unit 15 executes printing on a printing medium such as paper. The printing unit 15 includes various driving circuits and driving mechanisms besides printing heads adapted to various printing schemes such as an inkjet scheme and an electrophotographic scheme.

The reading unit 16 reads a document placed on a not-shown document table glass or a document set on a document tray of a not-shown ADF (Auto Document Feeder) and generates image data. The reading unit 16 includes, for example, various driving circuits and driving mechanisms for conveying the document besides a well-known color image sensor and a light source.

The facsimile communication unit 17 includes a modem and a peripheral circuit of the modem and receives a facsimile from the outside and transmits, by facsimile, the image data of the document read by the reading unit 16 through a public switched telephone network or the like.

In this embodiment, the multifunction peripheral 1 is installed in an office or the like. The user can use various functions realized by the configuration explained above using the multifunction peripheral 1. The multifunction peripheral 1 in this embodiment includes a plurality of functions such as a printing function realized by the printing unit 15, a scanning function realized by the reading unit 16, a copying function realized by the printing unit 15 and the reading unit 16, and a facsimile function realized by the reading unit 16 and the facsimile communication unit 17.

When the multifunction peripheral 1 is turned on, the control unit 10 executes a not-shown control program stored in the storage unit 11 and starts control of the multifunction peripheral 1. First, after executing various initial operations, the control unit 10 causes the display unit 12 to display a home screen P1 as a display image.

Figure 2:
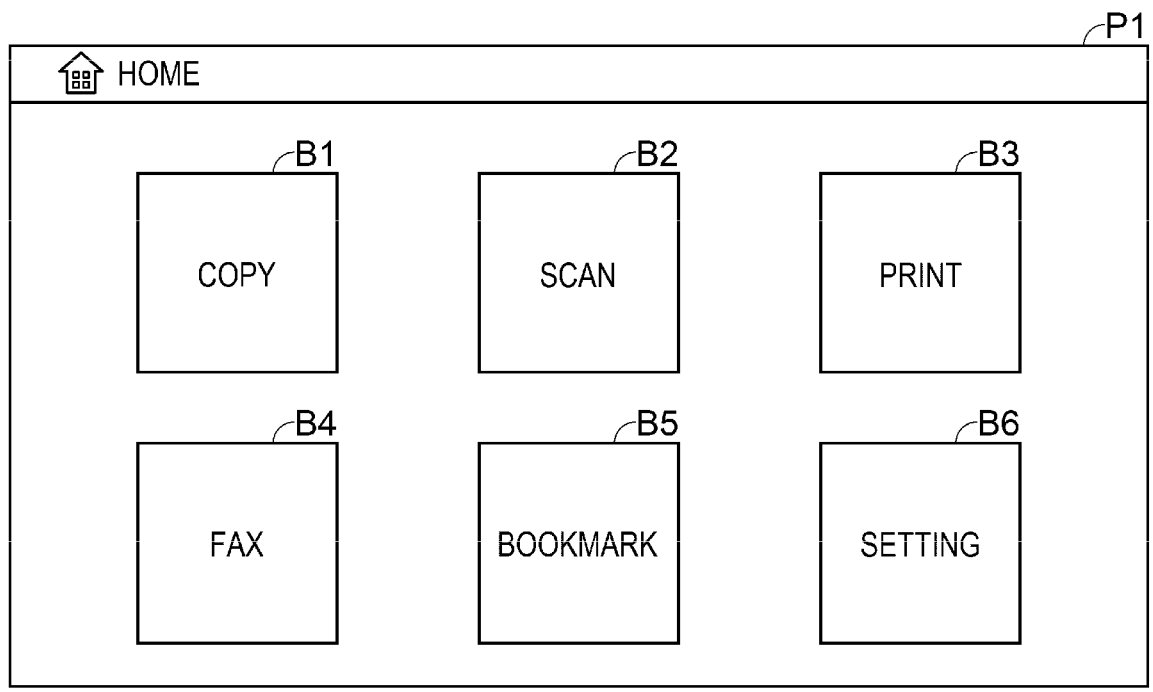
FIG. 2 is a diagram showing an example of a home screen.

FIG. 2 is a diagram showing an example of the home screen P1. The home screen P1 includes a plurality of function selection buttons B1 to B6 corresponding to the various functions and the like explained above. By tapping any one of the function selection buttons B1 to B6, the user can use a function associated with the tapped function selection button.

For example, when the function selection button B1 associated with the copying function is tapped by the user, the control unit 10 causes the reading unit 16 to execute document reading and, thereafter, causes the printing unit 15 to print an image based on image data generated by the reading.

For example, when the function selection button B2 corresponding to the scanning function is operated by the user, the control unit 10 can cause the reading unit 16 to execute document reading and cause the storage unit 11 to store generated image data or transmit the image data to the outside as an electronic mail via the network communication unit 14 according to an instruction of the user. When the transmission of the electronic mail is instructed by the user, the control unit 10 causes the display unit 12 to display, as a display image, a destination designation screen P2 for designating a destination of the electronic mail.

Figure 3:
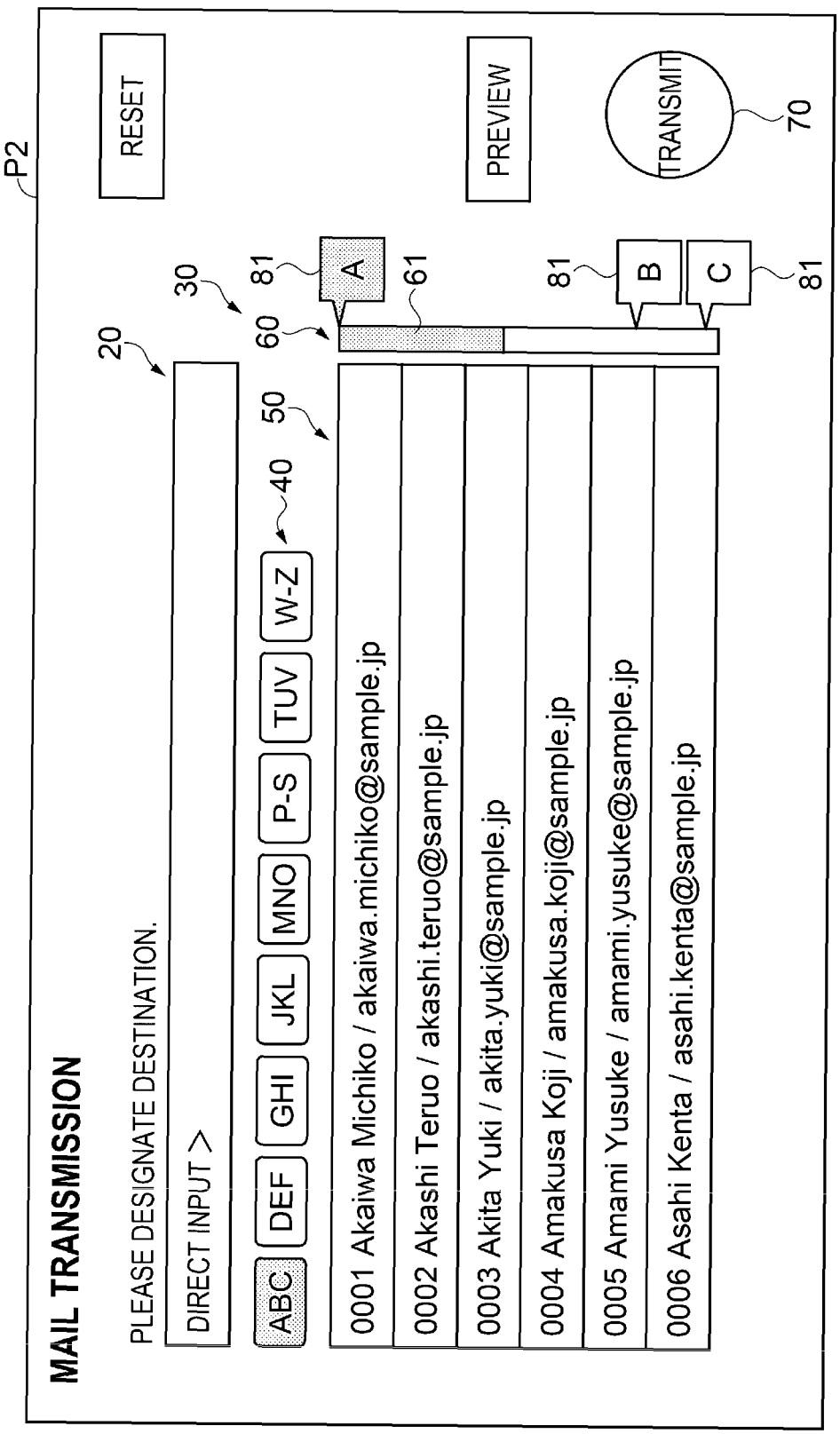
FIG. 3 is a diagram showing an example of a destination designation screen.

FIG. 3 is a diagram showing an example of the destination designation screen P2. Image data representing the destination designation screen P2 is generated by the control unit 10. The display unit 12 displays the destination designation screen P2 based on the image data output from the control unit 10. The destination designation screen P2 includes a destination input section 20, a destination selection section 30, and a transmission button 70.

A destination is input to the destination input section 20 by the user. When the user taps the destination input section 20, the control unit 10 causes the display unit 12 to display a not-shown keyboard screen over the destination designation screen P2. The user can input a mail address to the destination input section 20 by tapping a key button included in the keyboard screen.

The destination selection section 30 is arranged on the lower side of the destination input section 20. A plurality of destination candidates are displayed in the destination selection section 30 based on the destination book data stored in the storage unit 11. The user can easily designate a destination by tapping a destination candidate displayed in the destination selection section 30 instead of inputting a mail address to the destination input section 20.

The destination book data includes a plurality of destination data corresponding to the plurality of destination candidates. In the destination data in this embodiment, various kinds of information including registration names described in alphabets and mail addresses are registered. The destination candidates are sorted in predetermined order. A part of the destination candidates is displayed in the destination selection section 30. In this embodiment, the destination candidates are sorted in ascending order according to the alphabets of the registration names. Specifically, the control unit 10 reads out the destination book data from the storage unit 11, rearranges, in the order described above, the destination data included in the destination book data, and, thereafter, stores the destination data in the storage unit 11 as temporary data. Thereafter, the control unit 10 displays the destination candidates in the destination selection section 30 based on the temporary data.

The plurality of destination candidates included in the destination book data and the temporary data can be classified into a plurality of "groups" according to capital letters of the registration names. Since the plurality of destination candidates included in the temporary data are sorted according to the registration names, the destination candidates of the same group are continuously arrayed. The plurality of destination candidates can also be classified into a "cluster" obtained by combining some of the groups. For example, a cluster of "ABC" can be formed by combining a group having a capital letter A, a group having a capital letter B, and a group having a capital letter C.

The destination selection section 30 includes a cluster selection section 40, a destination candidate display section 50, and a scroll bar 60.

The cluster selection section 40 includes a plurality of cluster selection buttons for selecting a "cluster" to which the destination candidates belong. In this embodiment, the destination candidates are classified into eight clusters based on the capital letters of the registration names. Specifically, the destination candidates are classified into a cluster of "DEF", a cluster of "GHI", a cluster of "JKL", a cluster of "MNO", a cluster of "P to S", a cluster of "TUV", and a cluster of "W to Z" besides the cluster of "ABC" having the capital letter A, B, or C. In the cluster selection section 40, eight cluster selection buttons for selecting the clusters are disposed. The user can select a desired cluster by tapping any one of the cluster selection buttons of the cluster selection section 40. In the following explanation, a cluster selected in the cluster selection section 40 is referred to as "selected cluster" as well.

In the destination candidate display section 50, a list of destination candidates belonging to the selected cluster selected in the cluster selection section 40 is displayed. Specifically, registration names and mail addresses of the destination candidates are displayed. The destination candidate display section 50 is capable of displaying a predetermined number of destination candidates side by side in the up-down direction. Six destination candidates are displayed in the destination candidate display section 50 shown in FIG. 3. When the destination candidates belonging to the selected cluster selected in the cluster selection section 40 is more than the predetermined number, the user can cause the display unit 12 to display not-displayed destination candidates by operating the scroll bar 60 arranged adjacent to the destination candidate display section 50.

The scroll bar 60 is an image extending in a belt shape in the up-down direction. In the example shown in FIG. 3, the scroll bar 60 is arranged on the right side of the destination candidate display section 50. The length in the up-down direction of the scroll bar 60 is substantially equal to the height in the up-down direction of the destination candidate display section 50.

The scroll bar 60 is an image for scrolling destination candidates displayed in the destination candidate display section 50 and includes a knob 61 movable in the up-down direction. The user can move the knob 61 by performing drag operation for moving a finger up and down in a state in which the finger is touching the knob 61. The destination candidates displayed in the destination candidate display section 50 are scrolled according to a movement amount of the knob 61. The length in the up-down direction of the knob 61 is variable. The knob 61 is shorter as the number of destination candidates belonging to a selected cluster selected in the cluster selection section 40 is larger. Specifically, when the number of destination candidates displayed in the destination candidate display section 50 is represented as "display number", the length of the knob 61 with respect to the length of the entire scroll bar 60 corresponds to a display number with respect to the number of destination candidates belonging to the selected cluster. In this way, the knob 61 indicates a range, in the destination candidates belonging to the selected cluster, of the destination candidates displayed in the destination candidate display section 50 and is equivalent to the range display section.

In the destination selection section 30, a plurality of identification labels 81 for identifying groups to which the destination candidates belong are displayed. The identification labels 81 are added to the scroll bar 60 side by side in the up-down direction. The identification label 81 is equivalent to the first identification label. In the example shown in FIG. 3, since the cluster of "ABC" is selected in the cluster selection section 40, the identification labels 81 corresponding to three groups belonging to the cluster of "ABC" are added to the scroll bar 60. Specifically, three identification labels 81 respectively corresponding to the group having the capital letter A, the group having the capital letter B, and the group having the capital letter C are added. The alphabets of the capital letters are displayed on the identification labels 81.

Positions where the identification labels 81 are added to the scroll bar 60 correspond to start positions of the groups in the selected cluster. That is, positions where the identification labels 81 are added with respect to the range in the up-down direction of the scroll bar 60 correspond to positions of destination candidates at the tops of the groups in the entire destination candidates belonging to the selected cluster.

Since the position and the length of the knob 61 of the scroll bar 60 correspond to a range of the destination candidates displayed in the destination candidate display section 50, the identification label 81 of a group to which the destination candidates displayed in the destination candidate display section 50 belong is added to the knob 61. On the other hand, the identification labels 81 of groups to which destination candidates not displayed in the destination candidate display section 50 belong are added to the outer side in the up-down direction of the knob 61. In this embodiment, a background color of the identification label 81 added to the knob 61 is different from a background color of the identification labels 81 added to the outer side of the knob 61. Accordingly, the group of the destination candidates displayed in the destination candidate display section 50 at that point in time can be easily distinguished by the identification label 81. A method of distinguishing the identification labels 81 is not limited to a method of differentiating background colors of the identification labels 81 according to positions to which the identification labels 81 are added. For example, colors of letters included in the identification labels 81 may be differentiated. The identification label 81 added to the knob 61 may be displayed larger compared with the identification labels 81 added to the outer side of the knob 61. That is, if a display form of the identification label 81 is different between when the identification label 81 is added to the knob 61 and when the identification label 81 is added to the outer side of the knob 61, the same effects can be obtained. However, display forms of all the identification labels 81 may be the same.

By tapping any one of the displayed identification labels 81, the user can cause the display unit 12 to display, in the destination candidate display section 50, destination candidates belonging to a group corresponding to the identification label 81. That is, when any one of the identification labels 81 is tapped by the user, the control unit 10 updates display content of the destination candidate display section 50 such that a destination candidate at the top in the group corresponding to the tapped identification label 81 is displayed at the top of the destination candidate display section 50.

After causing the display unit 12 to display a desired destination in the destination candidate display section 50 by performing operation on the cluster selection section 40, operation on the identification label 81, and operation on the knob 61 of the scroll bar 60, the user can designate the destination by tapping the destination. After designating a destination by inputting the destination to the destination input section 20 or selecting the destination in the destination candidate display section 50, when the user performs operation for tapping the transmission button 70, the control unit 10 transmits image data of a document read by the reading unit 16 to a mail address of the designated destination.

Figure 4:
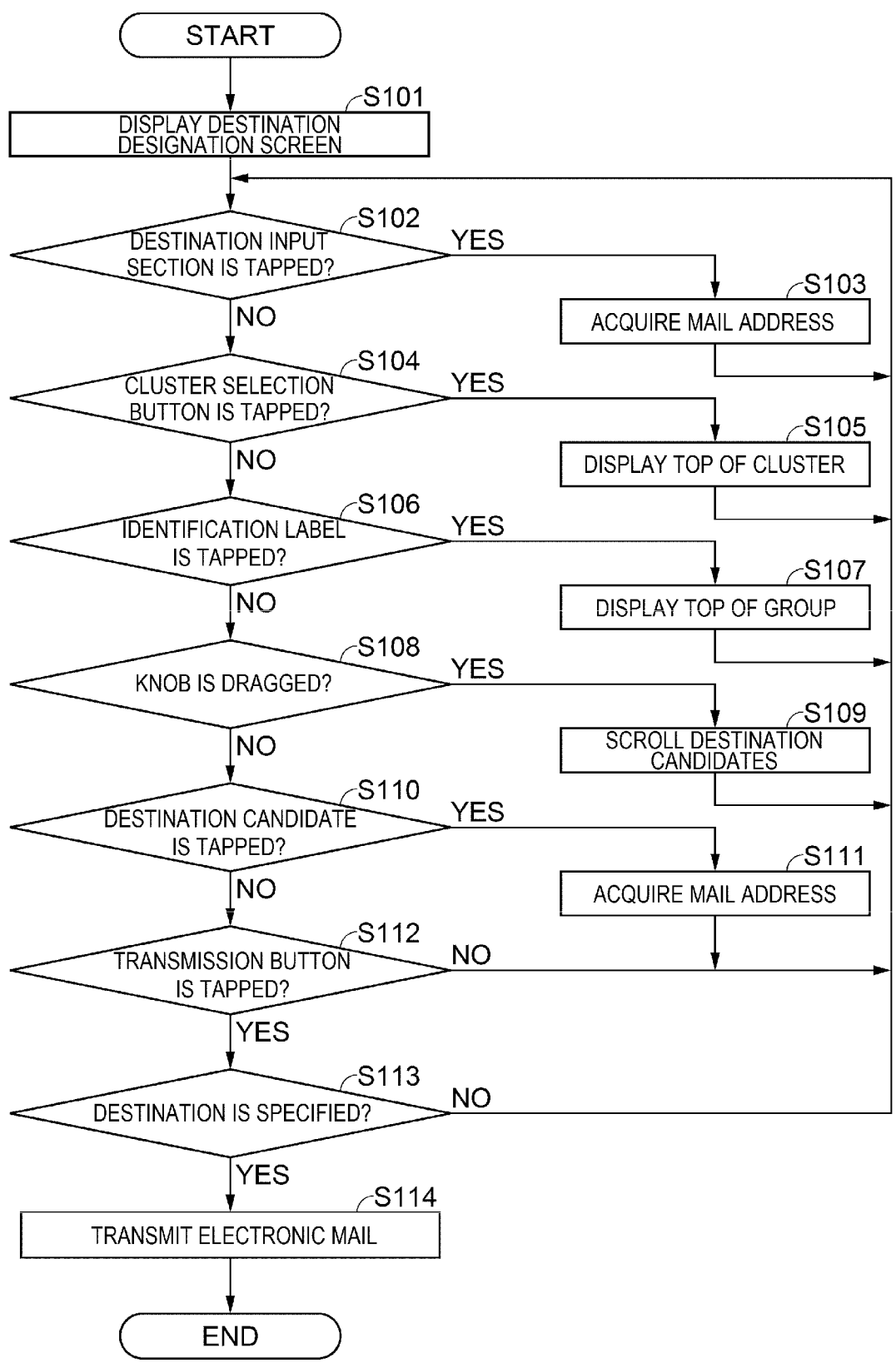
FIG. 4 is a flowchart for explaining an operation of the multifunction peripheral during display of the destination designation screen.

FIG. 4 is a flowchart for explaining an operation of the multifunction peripheral 1 that is displaying the destination designation screen P2. After the function selection button B2 corresponding to the scanning function is tapped by the user on the home screen P1 and the reading unit 16 executes document reading, when transmission by electronic mail is instructed by the user, the control unit 10 operates according to a flow shown in FIG. 4.

As shown in FIG. 4, in step S101, the control unit 10 causes the display unit 12 to display the destination designation screen P2.

In step S102, the control unit 10 determines whether the destination input section 20 is tapped by the user. When the destination input section 20 is tapped, the control unit 10 shifts the processing to step S103. When the destination input section 20 is not tapped, the control unit 10 shifts the processing to step S104.

When the destination input section 20 is tapped and the processing is shifted to step S103, the control unit 10 displays a keyboard screen over the destination designation screen P2. When the user inputs a mail address using the keyboard screen, the control unit 10 acquires the input mail address and specifies the mail address as a destination. Thereafter, the control unit 10 returns the processing to step S102.

When the processing is shifted to step S104, the control unit 10 determines whether any cluster selection button of the cluster selection section 40 is tapped. When any cluster selection button is tapped, the control unit 10 shifts the processing to step S105. When no cluster selection button is tapped, the control unit 10 shifts the processing to step S106.

When any cluster selection button is tapped and the processing is shifted to step S105, the control unit 10 reversely displays the tapped cluster selection button and updates the display content of the destination candidate display section 50 such that a predetermined number of destination candidates from a destination candidate at the top in a cluster corresponding to the cluster selection button are displayed in the destination candidate display section 50. Thereafter, the control unit 10 returns the processing to step S102.

When the processing is shifted to step S106, the control unit 10 determines whether any one of the identification labels 81 added to the scroll bar 60 is tapped. When any one of the identification labels 81 is tapped, the control unit 10 shifts the processing to step S107. When none of the identification labels 81 is tapped, the control unit 10 shifts the processing to step S108.

When any one of the identification labels 81 is tapped and the processing is shifted to step S107, the control unit 10 updates the display content of the destination candidate display section 50 such that a predetermined number of destination candidates from a destination candidate at the top in a group corresponding to the tapped identification label 81 are displayed in the destination candidate display section 50. Thereafter, the control unit 10 returns the processing to step S102.

When the processing is shifted to step S108, the control unit 10 determines whether the knob 61 of the scroll bar 60 is dragged. When the knob 61 is dragged, the control unit 10 shifts the processing to step S109. When the knob 61 is not dragged, the control unit 10 shifts the processing to step S110.

When the knob 61 of the scroll bar 60 is dragged and the processing is shifted to step S109, the control unit 10 moves the position of the knob 61 according to a distance and a direction of the dragging and scrolls the destination candidates displayed in the destination candidate display section 50. Thereafter, the control unit 10 returns the processing to step S102.

When the processing is shifted to step S110, the control unit 10 determines whether any one of the destination candidates displayed in the destination candidate display section 50 is tapped. When any one of the destination candidates is tapped, the control unit 10 shifts the processing to step S111. When none of the destination candidates is tapped, the control unit 10 returns the processing to step S112.

When any one of the destination candidates is tapped and the processing is shifted to step S111, the control unit 10 specifies the tapped destination candidate as a destination and acquires a mail address from destination data corresponding to the destination. Thereafter, the control unit 10 returns the processing to step S102.

When the processing is shifted to step S112, the control unit 10 determines whether the transmission button 70 is tapped. When the transmission button 70 is tapped, the control unit 10 shifts the processing to step S113. When the transmission button 70 is not tapped, the control unit 10 shifts the processing to step S102.

When the transmission button 70 is tapped and the processing is shifted to step S113, the control unit 10 determines whether a destination is specified, that is, whether a mail address is acquired in step S103 or step S111. When a destination is specified, the control unit 10 shifts the processing to step S114. When a destination is not specified, the control unit 10 shifts the processing to step S102.

When a destination is specified and the processing is shifted to step S114, the control unit 10 creates an electronic mail addressed to the acquired mail address, transmits the electronic mail attached with the image data of the document read by the reading unit 16, and ends the flow.

As explained above, according to this embodiment, it is possible to obtain the following effects.

(1) According to this embodiment, the identification labels 81 for identifying the groups to which the destination candidates belong are displayed on the scroll bar 60 for scrolling the destination candidates. Therefore, the user is capable of easily finding out a desired destination by referring to the identification labels 81.

(2) According to this embodiment, by tapping any one of the identification labels 81, the destination candidates of the group corresponding to the identification label 81 are displayed in the destination candidate display section 50. Therefore, it is easier to find out a desired destination.

(3) According to this embodiment, the display form of the identification label 81 is different between when the identification label 81 is added to the knob 61 of the scroll bar 60 and when the identification label 81 is added to the outer side of the knob 61. Therefore, it is possible to easily distinguish groups displayed in the destination candidate display section 50 at that point in time.

2. Second Embodiment

The multifunction peripheral 1 in a second embodiment is explained below with reference to the drawings. The multifunction peripheral 1 in this embodiment has the same configuration as the configuration of the multifunction peripheral 1 in the first embodiment. Therefore, explanation of the configuration is omitted. In the second embodiment, a form of the identification labels 81 added to the scroll bar 60 is different from the form in the first embodiment.

Figure 5:
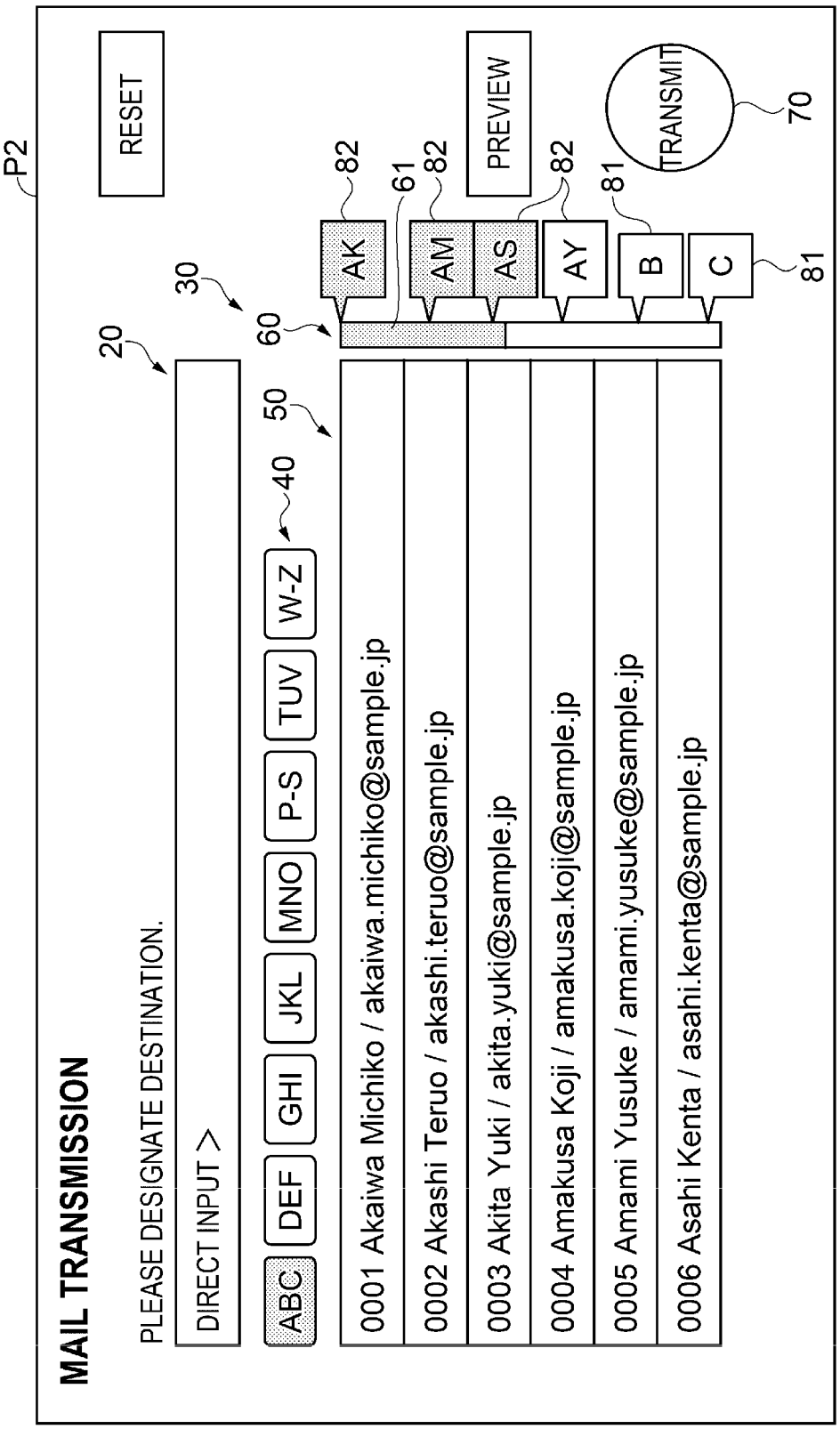
FIG. 5 is a diagram showing an example of a destination designation screen in a second embodiment.

FIG. 5 is a diagram showing an example of the destination designation screen P2 in the second embodiment. In this embodiment, when a predetermined condition is satisfied, a form of the identification labels 81 added to the scroll bar 60 changes. Specifically, when a condition that a total number of destination candidates belonging to one group is equal to or larger than a predetermined number is satisfied, the control unit 10 adds, to the scroll bar 60, subdivided identification labels 82 for identifying subgroups obtained by further subdividing the groups.

The plurality of destination candidates included in the destination book data or the temporary data can be classified into a plurality of "groups" according to capital letters of registration names and can be further classified into a plurality of "subgroups" according to alphabets of second letters of the registration names. In the example shown in FIG. 5, assuming that a total number of destination candidates belonging to a group having a capital letter "A" of a registration name is equal to or larger than the predetermined number, the destination candidates belonging to the group are further classified into a plurality of subgroups according to alphabets of second letters. The subdivided identification labels 82 for identifying the subgroups are added to the scroll bar 60. The subdivided identification label 82 is equivalent to the second identification label.

The capital letters and the alphabets of the second letters are displayed on the subdivided identification labels 82. The user can identify the subgroups with the subdivided identification labels 82. Further, when any one of the subdivided identification labels 82 is tapped, the control unit 10 updates display content of the destination candidate display section 50 such that a predetermined number of destination candidates from a destination candidate at the top in a subgroup corresponding to the tapped subdivided identification label 82 are displayed in the destination candidate display section 50.

As explained above, according to this embodiment, when a large number of destination candidates are included in one group, the subdivided identification labels 82 for identifying subgroups obtained by subdividing the group are added to the scroll bar 60. Therefore, it is easy to find out a desired destination.

A predetermined condition for displaying the subdivided identification labels 82 is not limited to the predetermined condition explained above. For example, the subdivided identification labels 82 may be displayed when the user performs predetermined operation on any one of the identification labels 81 and the operation unit 13 receives the operation. As the predetermined operation, for example, operation for, in a state in which the user is touching any one of the identification labels 81, dragging the identification label 81 in the right direction can be adopted.

When any one of the identification labels 81 is tapped by the user and the operation unit 13 receives the operation, after the same operation as the operation in the first embodiment for causing the display unit 12 to display, in the destination candidate display section 50, destination candidates of a group corresponding to the identification label 81 is performed, the subdivided identification label 82 of the group may be displayed. With this configuration, after tapping the identification label 81 and selecting a group, the user can further select a subgroup. Therefore, it is easy to find out a desired destination. At this time, it is desirable to hide the identification labels 81 that are not tapped. Consequently, it is possible to reduce the number of identification labels 81 to be displayed.

3. Third Embodiment

The multifunction peripheral 1 in a third embodiment is explained below with reference to the drawings. The multifunction peripheral 1 in this embodiment has the same configuration as the configuration of the multifunction peripheral 1 in the first embodiment and the second embodiment. Therefore, explanation of the configuration is omitted. In the third embodiment, a form in selecting a subgroup is different from the form in the second embodiment.

Figure 6:
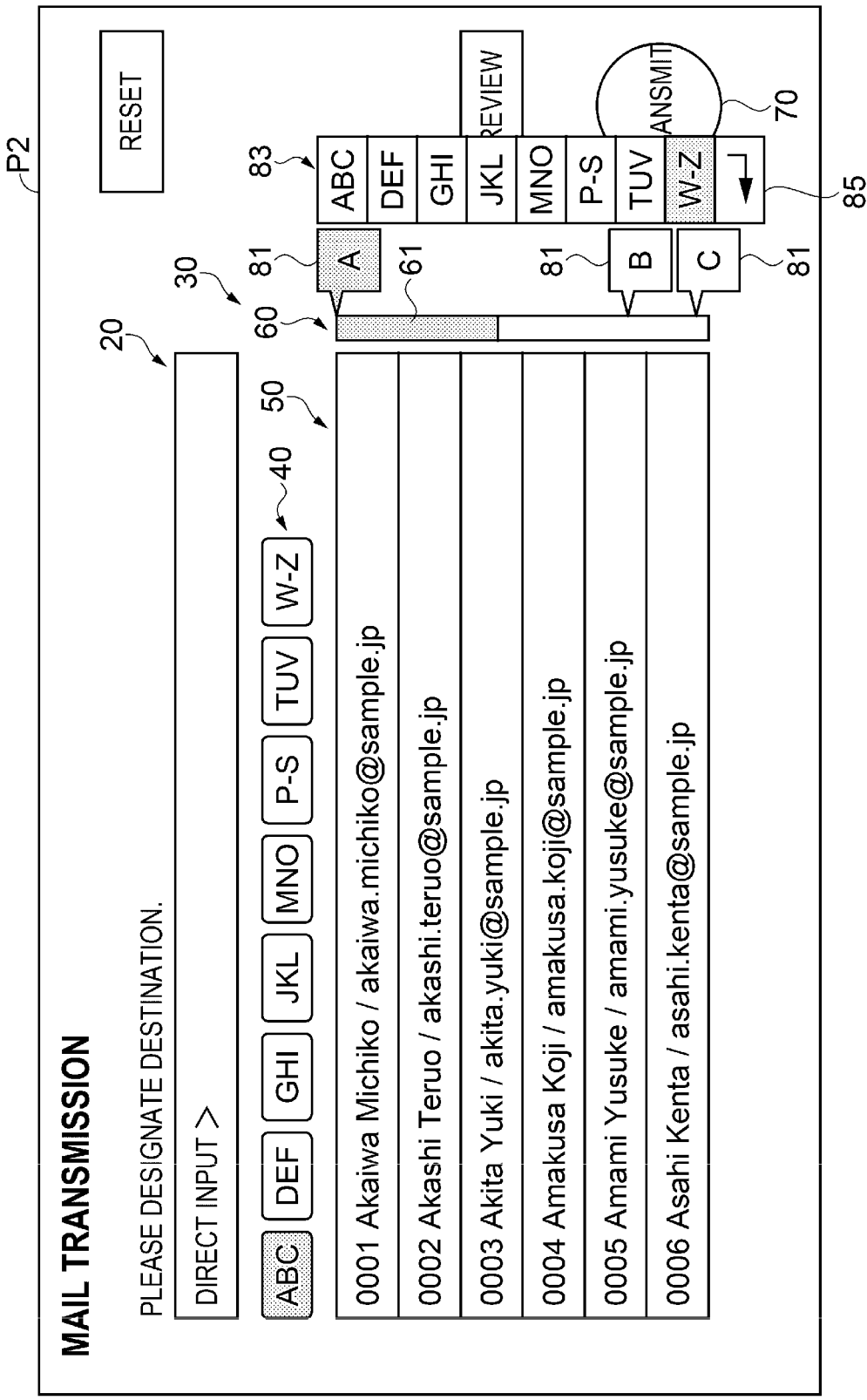
FIG. 6 is a diagram showing an example of the destination designation screen at the time when a subgroup is selected.
Figure 7:
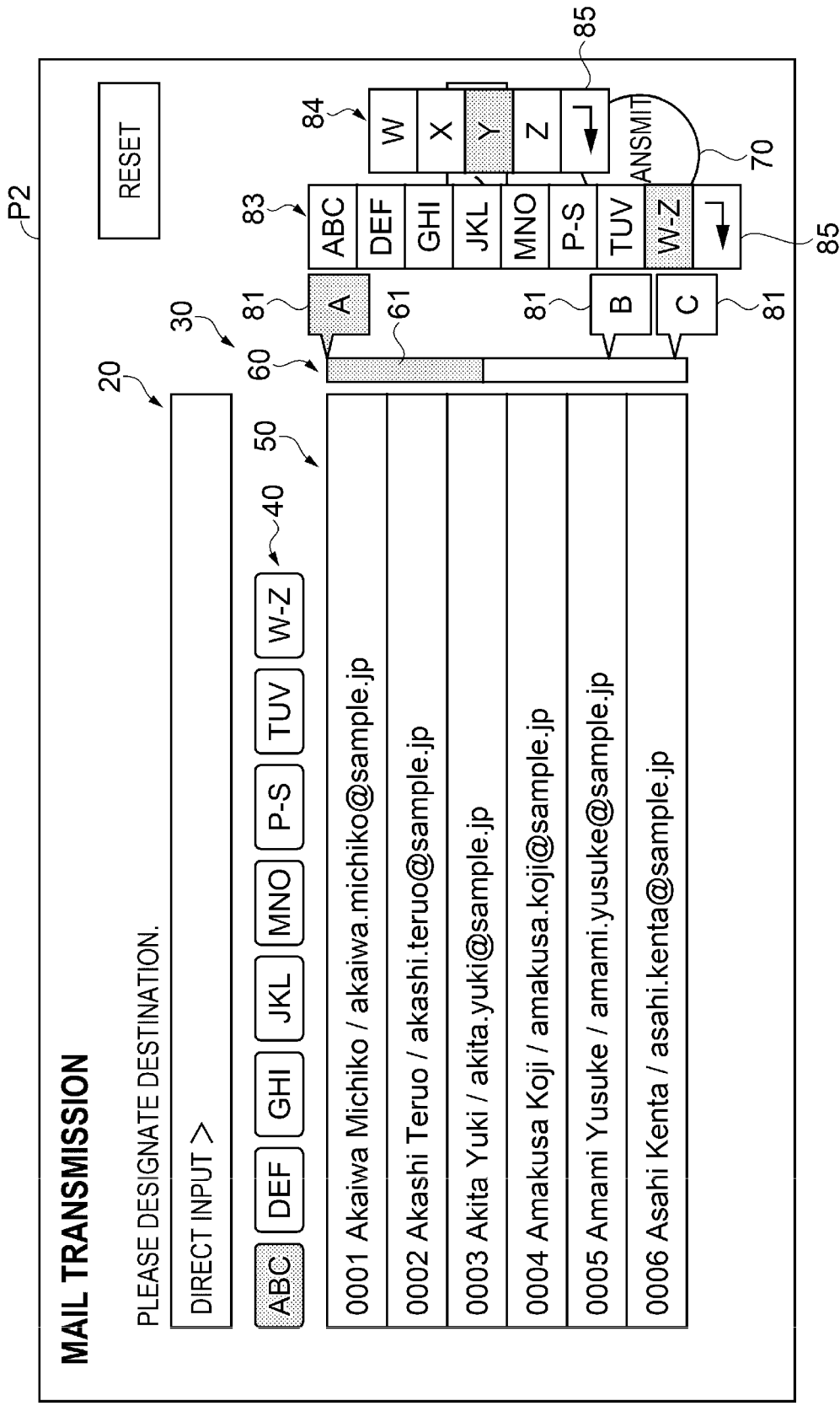
FIG. 7 is a diagram showing an example of the destination designation screen at the time when the subgroup is selected.

FIGS. 6 and 7 are diagrams showing an example of the destination designation screen P2 in selecting a subgroup. In this embodiment, when a user taps any one of the identification labels 81 added to the scroll bar 60 on the destination designation screen P2 shown in FIG. 3, the control unit 10 causes the display unit 12 to display a cluster selection menu 83 in a position adjacent to the identification label 81 as shown in FIG. 6. In FIG. 6, an example is shown in which the identification label 81 of the group having the capital letter "A" is tapped.

The cluster selection menu 83 is a menu for designating a second letter of a registration name. A cluster to which the second letter of the registration name belongs can be selected out of eight clusters each including a plurality of letters such as "ABC", "DEF" and "GHI". When the user taps one cluster out of the eight clusters, as shown in FIG. 7, the control unit 10 causes the display unit 12 to display, in a position adjacent to the cluster selection menu 83, a letter selection menu 84 in which a plurality of letters included in the cluster can be selected.

The user taps a letter corresponding to the second letter of the registration name out of the letter selection menu 84 to thereby decide selection of a subgroup. The control unit 10 updates display content of the destination candidate display section 50 such that a predetermined number of destination candidates from a destination candidate at the top in the subgroup are displayed in the destination candidate display section 50. In FIG. 7, an example is shown in which "W to Z" is tapped in the cluster selection menu 83 as the cluster to which the second letter of the registration name belongs and, thereafter, "Y" is tapped in the letter selection menu 84 as the letter corresponding to the second letter of the registration name.

A decision button 85 is included in the cluster selection menu 83 and the letter selection menu 84. The user can omit selection of a cluster and a letter by tapping the decision button 85 instead of tapping the cluster and the letter. For example, when the decision button 85 is tapped in the cluster selection menu 83 instead of the cluster, the control unit 10 updates the display content of the destination candidate display section 50 such that a predetermined number of destination candidates from a destination candidate at the top in a group corresponding to the identification label 81 tapped before the decision button 85 are displayed in the destination candidate display section 50. In this case, the selection concerning the second letter of the registration name is omitted. When the decision button 85 is tapped instead of the letter in the letter selection menu 84, the control unit 10 updates the display content of the destination candidate display section 50 such that a predetermined number of destination candidates from a destination candidate at the top in a cluster tapped in the cluster selection menu 83 before the decision button 85 are displayed in the destination candidate display section 50. In this case, the specifying of the second letter of the registration name is omitted.

As shown in FIGS. 6 and 7, the cluster selection menu 83 and the letter selection menu 84 can be arranged to overlap an operation target element in the vicinity such as the transmission button 70. Accordingly, when the cluster selection menu 83 and the letter selection menu 84 are displayed, it is desirable to disable operation on other operation target elements and prevent wrong operation.

As explained above, according to this embodiment, it is possible to obtain the same effects as the effects in the second embodiment.

The embodiments explained above may be changed as explained below.

In the embodiments explained above, when the destination candidates belonging to the corresponding group or subgroup is less than the predetermined number, the identification label 81 or the subdivided identification label 82 may not be displayed. In the example shown in FIG. 5, the subdivided identification label 82 is not displayed for a subgroup including no corresponding destination candidate.

In the second embodiment explained above, an example is explained in which the subdivided identification labels 82 for identifying subgroups obtained by subdividing a group are displayed. However, the subgroups may be subdivided into finer units and identification labels for identifying the units may be displayed.

In the embodiments explained above, frequencies of use of the destination candidates may be recorded and presence or absence of display of the identification labels 81 may be determined according to the frequencies of use. For example, if only the identification label 81 of a group to which destination candidates having high frequencies of use belong is displayed, it is easy to find out a destination having a high frequency of use and convenience of the user is improved.

In the embodiments explained above, a case is explained in which the registration names are registered in the alphabets. However, the registration names may be registered in characters other than the alphabets. For example, in the multifunction peripheral 1 adapted to Japanese, when registration names represented by Chinese characters or the like, readings of the registration names represented by Hiragana characters or the like, and mail addresses are registered in destination data of destination candidates, a plurality of destination candidates can be classified into groups and clusters according to the readings of the registration names. For example, the plurality of destination candidates can be classified into a plurality of groups according to first Hiragana characters of the readings of the registration names and classified into a plurality of clusters according to the rows in the Japanese syllabary table. In this case, cluster selection buttons corresponding to the rows of the Japanese syllabary table such as "a", "ka", and "sa" are arranged in the cluster selection section 40 of the destination selection section 30. For example, when a cluster of "a" is selected in the cluster selection section 40, the identification labels 81 corresponding to groups of "a", "i", "u", "e", and "o" are added to the scroll bar 60.

In the embodiments explained above, the groups for classifying the destination candidates are not limited to the groups based on the letters such as the alphabets. The groups may be groups classified based on a variety of standards such as various numbers, relationships, belonging departments, and regions.

In the embodiments explained above, the multifunction peripheral 1 is explained as an example of the display apparatus. However, the display apparatus is not limited to the multifunction peripheral 1 and only has to be an apparatus that causes a display unit to display a plurality of destination candidates in order to determine a destination. The destination is not limited to the mail address and may be a telephone number, a facsimile number, an address, or the like.

What is claimed is:

1. A display apparatus comprising:
   a memory configured to store destination book data including a plurality of destination candidates;
   a display configured to display a display image including a destination candidate display section for displaying a predetermined number of destination candidates among the plurality of destination candidates and a scroll bar corresponding to the destination candidate display section;
   an operation unit configured to receive a first operation for pointing a position in the display image; and
   a processor configured to specify, based on the first operation, a destination out of the plurality of destination candidates, wherein
   the plurality of destination candidates are classified into a plurality of groups,
   the display adds, to the scroll bar, a first identification label for identifying a group of destination candidates of the plurality of groups and displays the first identification label, and
   the first identification label represents a position on the scroll bar corresponding to the group among the plurality of destination candidates.

2. The display apparatus according to claim 1, wherein the plurality of destination candidates are arrayed such that the destination candidates of a same group continue.

3. The display apparatus according to claim 1, wherein, when the operation unit receives a second operation for pointing the first identification label, the display displays, in the destination candidate display section, the destination candidates of the group corresponding to the pointed first identification label.

4. The display apparatus according to claim 1, wherein
   the scroll bar includes a range display section showing a range, in the plurality of destination candidates, of the predetermined number of destination candidates displayed in the destination candidate display section, and
   a display form of the first identification label is different between when the first identification label is added to the range display section and when the first identification label is added to an outer side of the range display section.

5. The display apparatus according to claim 1, wherein
   the plurality of destination candidates classified into the plurality of groups are further classified into a plurality of subgroups, and
   when a predetermined condition is satisfied, the display adds a second identification label for identifying a subgroup of the plurality of subgroups to the scroll bar and displays the second identification label.

6. The display apparatus according to claim 5, wherein the predetermined condition is that a number of the destination candidates included in the group corresponding to the first identification label is equal to or larger than a predetermined number.

7. The display apparatus according to claim 5, wherein the predetermined condition is that the operation unit receives a predetermined operation for the first identification label.

8. The display apparatus according to claim 5, wherein
   the predetermined condition is that the operation unit receives a second operation for pointing the first identification label, and
   when the operation unit receives the second operation for pointing the first identification label, the display displays, in the destination candidate display section, the destination candidates of the group corresponding to the pointed first identification label and displays the second identification label.

9. The display apparatus according to claim 8, wherein the display hides the first identification label that is not pointed.

10. The display apparatus according to claim 1, wherein the display does not display the first identification label for a group not including the destination candidates.

11. The display apparatus according to claim 1, wherein the display displays the first identification label for the group to which the destination candidates having a high frequency of use among the plurality of destination candidates belong.

12. A display apparatus comprising:
a memory configured to store destination book data including a plurality of destination candidates;
a display configured to display a display image including a destination candidate display section for displaying a predetermined number of destination candidates among the plurality of destination candidates and a scroll bar corresponding to the destination candidate display section,
   wherein the scroll bar includes a range display section showing a range, in the plurality of destination candidates, of the predetermined number of destination candidates displayed in the destination candidate display section;
an operation unit configured to receive an operation for pointing a position in the display image; and
a processor configured to specify, based on the operation, a destination out of the plurality of destination candidates, wherein
   the plurality of destination candidates are classified into a plurality of groups,
   the display adds, to the scroll bar, a first identification label for identifying a group of destination candidates of the plurality of groups and displays the first identification label, and
   a display form of the first identification label is different between when the first identification label is added to the range display section and when the first identification label is added to an outer side of the range display section.

13. A display apparatus comprising:
a memory configured to store destination book data including a plurality of destination candidates;
a display configured to display a display image including a destination candidate display section for displaying a predetermined number of destination candidates among the plurality of destination candidates and a scroll bar corresponding to the destination candidate display section;
an operation unit configured to receive an operation for pointing a position in the display image; and
a processor configured to specify, based on the operation, a destination out of the plurality of destination candidates, wherein
   the plurality of destination candidates are classified into a plurality of groups and a plurality of subgroups, and
   the display:
      adds, to the scroll bar, a first identification label for identifying a group of destination candidates of the plurality of groups and displays the first identification label, and
      when a predetermined condition is satisfied, adds a second identification label for identifying a subgroup of the plurality of subgroups to the scroll bar and displays the second identification label.

* * * * *